US011105727B2

(12) United States Patent
Ahn et al.

(10) Patent No.: US 11,105,727 B2
(45) Date of Patent: Aug. 31, 2021

(54) DEVICE FOR MEASURING A PARTICLE SIZE OF SAMPLE

(71) Applicant: Korea University Research and Business Foundation, Seoul (KR)

(72) Inventors: Dong June Ahn, Seoul (KR); Myung Ki Kim, Seoul (KR); Ye Dam Lee, Seoul (KR); Nu Ri Park, Cheongju-si (KR)

(73) Assignee: Korea University Research and Business Foundation, Seoul (KR)

( * ) Notice: Subject to any disclaimer, the term of this patent is extended or adjusted under 35 U.S.C. 154(b) by 0 days.

(21) Appl. No.: 16/702,227

(22) Filed: Dec. 3, 2019

(65) Prior Publication Data

US 2021/0164880 A1    Jun. 3, 2021

(30) Foreign Application Priority Data

Dec. 3, 2019 (KR) .................. 10-2019-0159108

(51) Int. Cl.
*G01N 15/10* (2006.01)
*B82Y 20/00* (2011.01)

(52) U.S. Cl.
CPC .............. *G01N 15/10* (2013.01); *B82Y 20/00* (2013.01); *G01N 2015/1087* (2013.01)

(58) Field of Classification Search
CPC ......... G01N 21/648; G01N 2021/6419; G01N 2021/6441; G01N 21/6454; G01N 2021/6439; G01N 21/6428; G01N 21/6452; G01N 2201/062; G01N 2021/6421; G01N 21/6408; G01N 21/6486; G01N 2201/06113; G01N 2021/6478; G01N 21/64; G01N 21/645; G01N 21/7743; G01N 21/7746; G01N 2201/02; G01N 2201/0612; G01N 2201/068; G01N 2201/125;
(Continued)

(56) References Cited

U.S. PATENT DOCUMENTS 5,858,799 A * 1/1999 Yee ..................... G01N 21/553
                                                    204/400
2009/0238236 A1* 9/2009 Fleury-Frenette ........ G01J 5/58
                                                    374/121
(Continued)

FOREIGN PATENT DOCUMENTS

JP      2009264744 A    11/2009
JP      2012215473 A    11/2012
KR      10-1301969 B1    8/2013
KR   10-2014-0059368 A    5/2014

OTHER PUBLICATIONS

Communication dated Feb. 10, 2021, issued by the Korean Intellectual Property Office in Korean Application No. 10-2019-0159108.

*Primary Examiner* — Michael P Stafira
(74) *Attorney, Agent, or Firm* — Sughrue Mion, PLLC

(57) ABSTRACT

The present invention provides a device for measuring a particle size at a low temperature, specifically, which includes a refrigerant tank containing a refrigerant; a heat conduction plate thermally connected to the refrigerant tank; and a nanoantenna located on the heat conduction plate, thereby it is possible to determine a degree of light transmission to the sample to be measured located on an upper portion of the nanoantenna, and predict the physical properties of the sample.

8 Claims, 14 Drawing Sheets

(58) Field of Classification Search
CPC .............. G01N 2021/6463; G01N 2201/0696; G01N 2201/08; G01N 2201/12; G01N 2201/0446; G01N 21/658; G01N 21/17; G01N 2610/00; G01N 33/54366; G01N 33/54386; G02B 6/1226; G02B 5/008; G02B 5/18; G02B 6/1228; G02B 6/122; G02B 6/4202; G02B 2006/121; G02B 2006/12123; G02B 27/56; G02B 6/00; G02B 6/107; G02B 6/12004; G02B 6/4214; G02B 6/43; B82Y 20/00; B82Y 15/00; B82Y 25/00; B82Y 10/00; G01J 1/42; G01J 1/04; G01J 1/4228; G01J 1/44; G01J 5/0837; G01J 5/20; G01B 11/272

See application file for complete search history.

(56) References Cited

U.S. PATENT DOCUMENTS

| | | | | |
|---|---|---|---|---|
| 2010/0103421 | A1* | 4/2010 | Johansen | G01N 21/03 356/367 |
| 2011/0090431 | A1* | 4/2011 | Masuda | G01J 1/0407 349/96 |
| 2011/0170103 | A1* | 7/2011 | Gomez Rivas | G01N 21/648 356/445 |
| 2016/0161644 | A1* | 6/2016 | Verschuuren | H01S 5/005 250/396 R |
| 2017/0067826 | A1* | 3/2017 | Sadowski | G01N 21/43 |
| 2017/0330653 | A1* | 11/2017 | Lee | H01B 12/16 |
| 2018/0262155 | A1* | 9/2018 | Fountain | H01Q 1/248 |
| 2020/0306757 | A1* | 10/2020 | Lee | B01L 3/50273 |

* cited by examiner

[FIG. 1]
1000
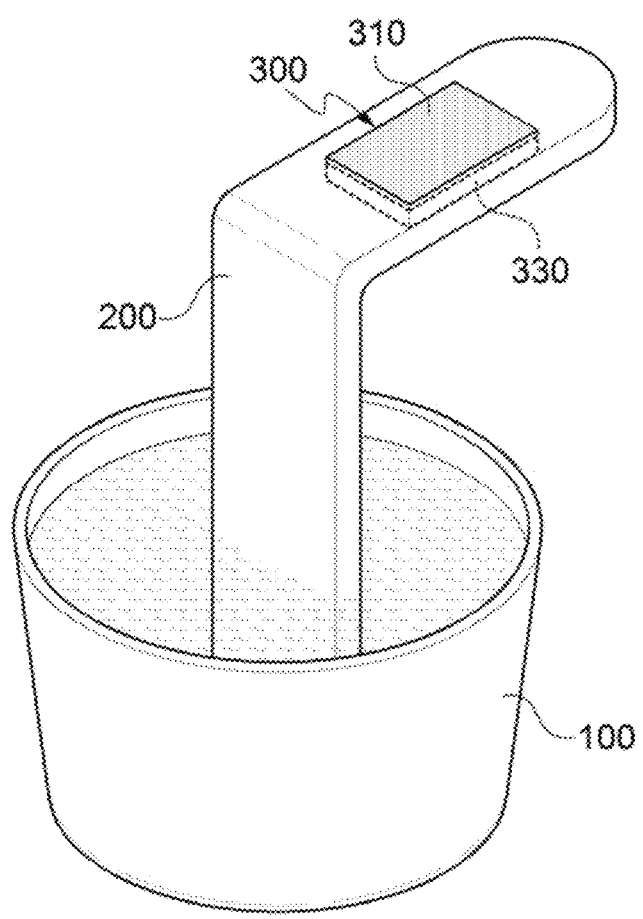

[FIG. 2]
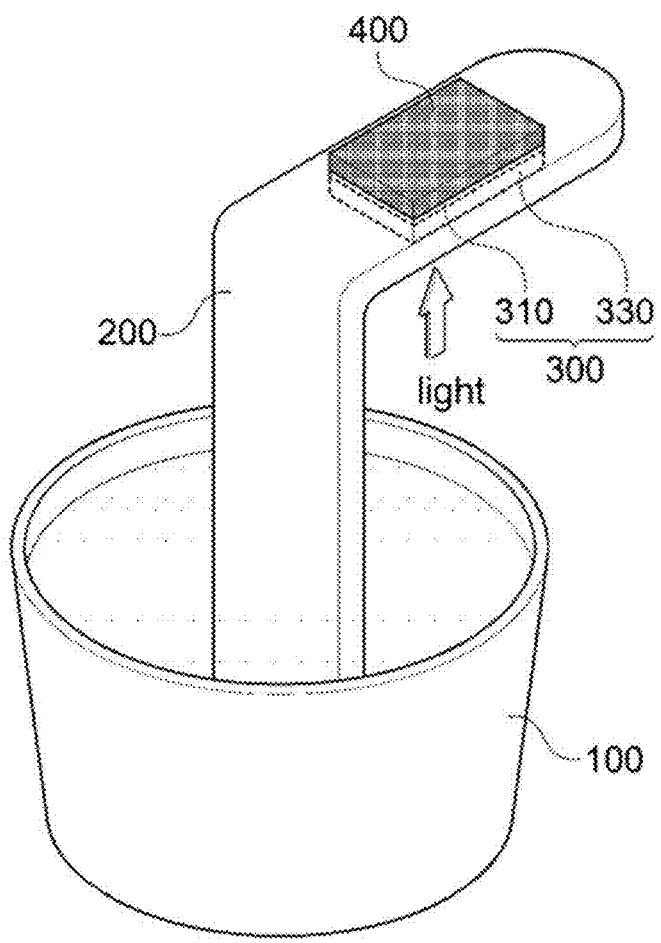

[FIG. 3]
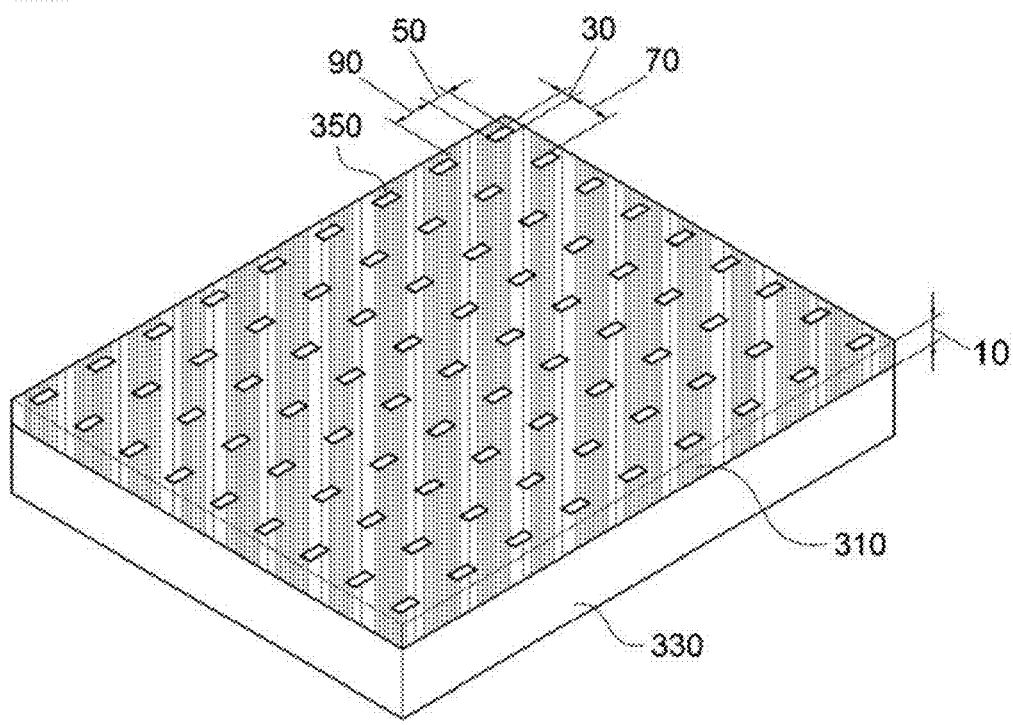
[FIG. 4]
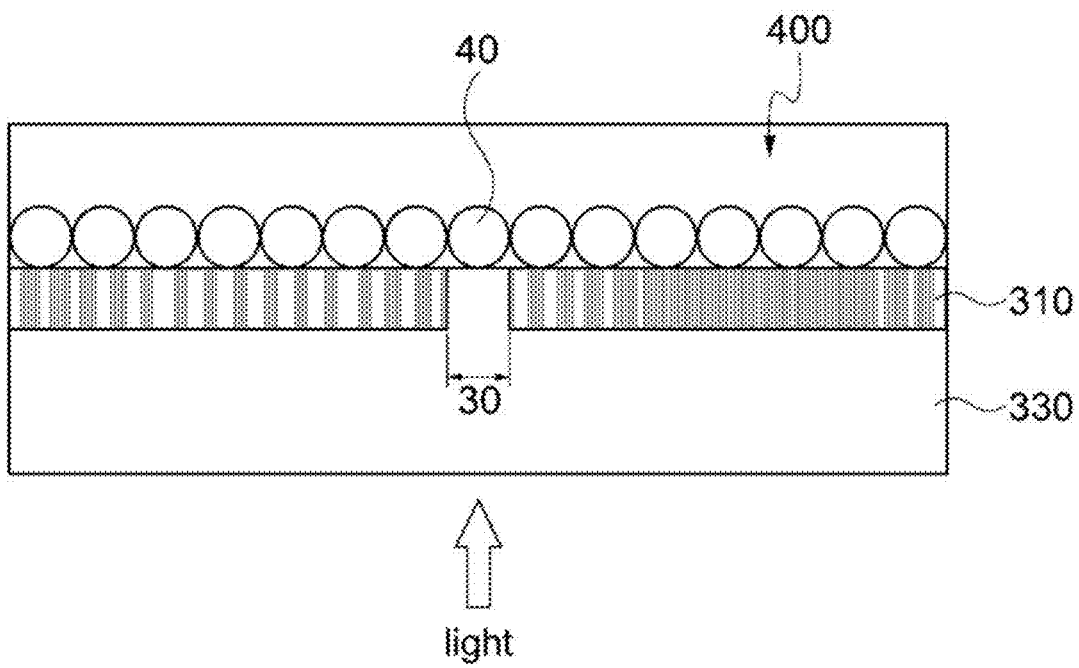

[FIG. 5]
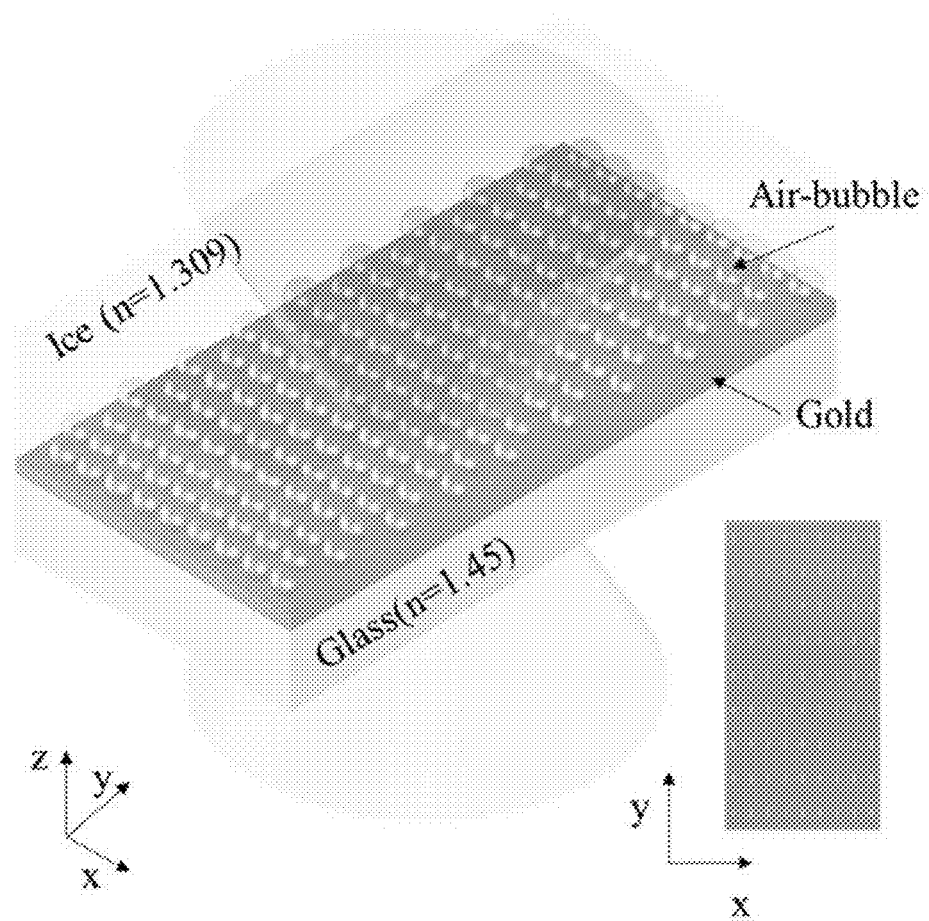

[FIG. 6]
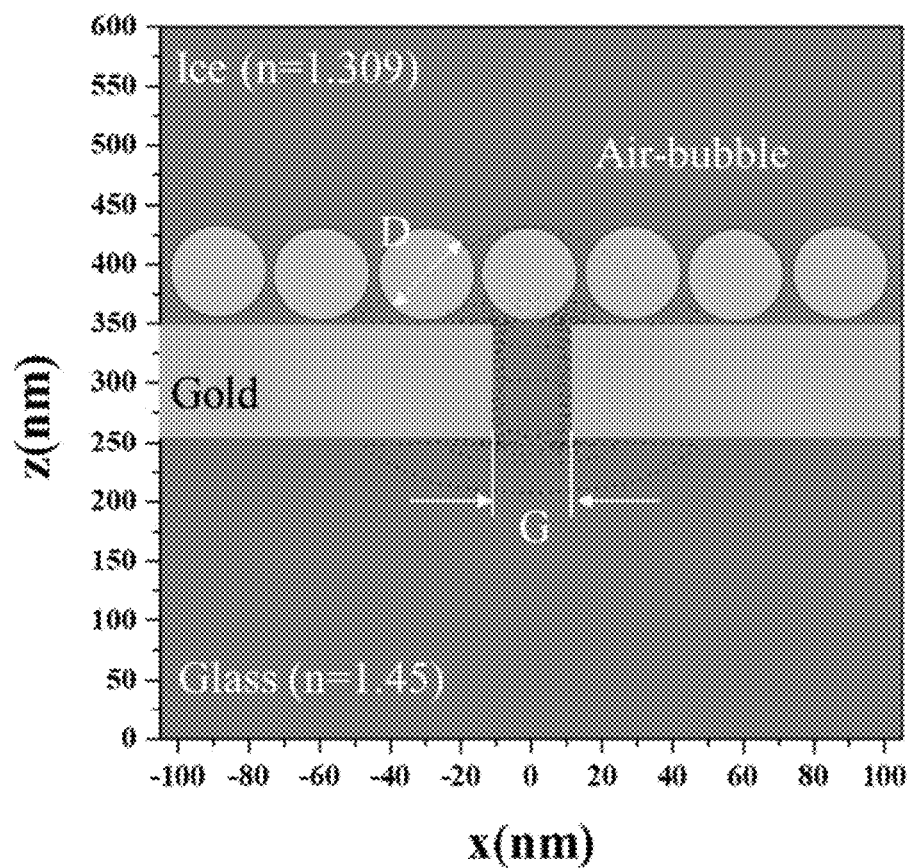

[FIG. 7]
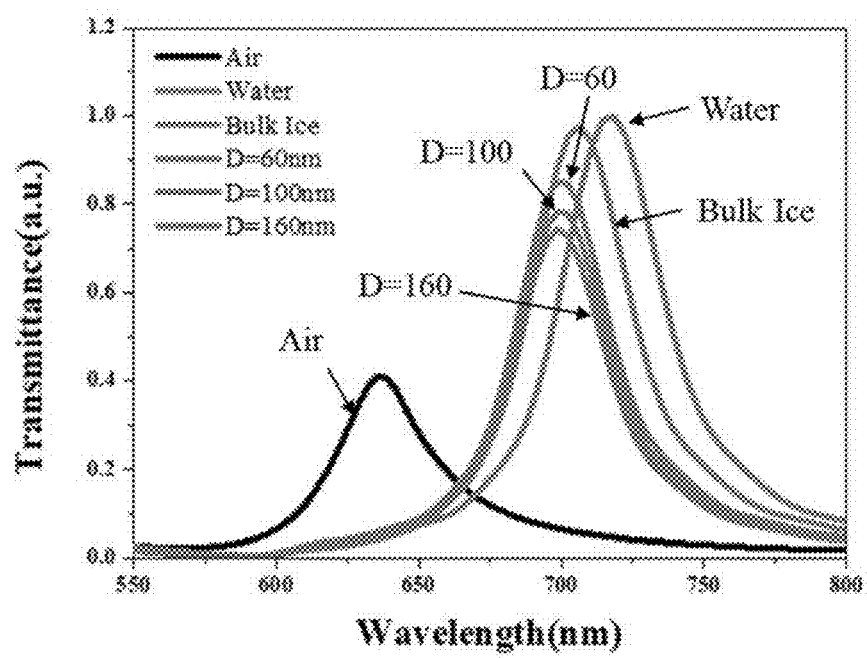
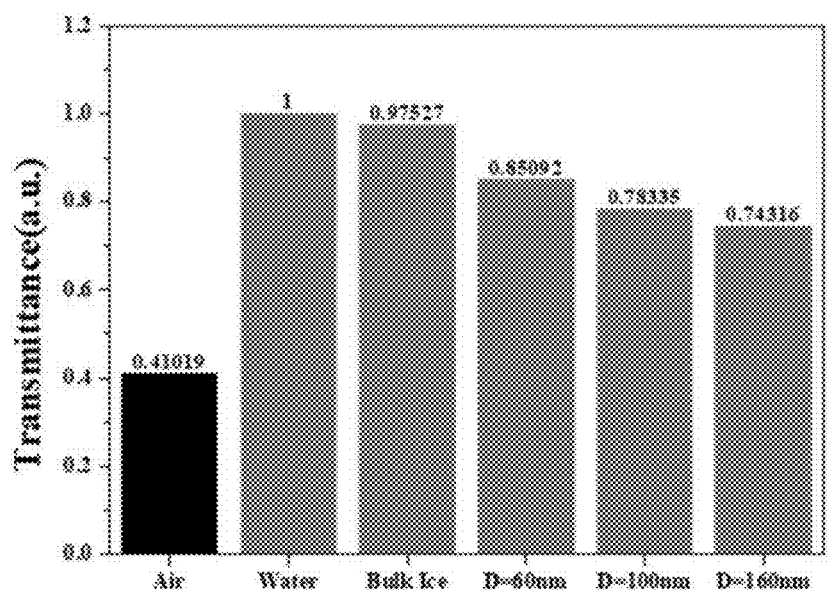

[FIG. 8]
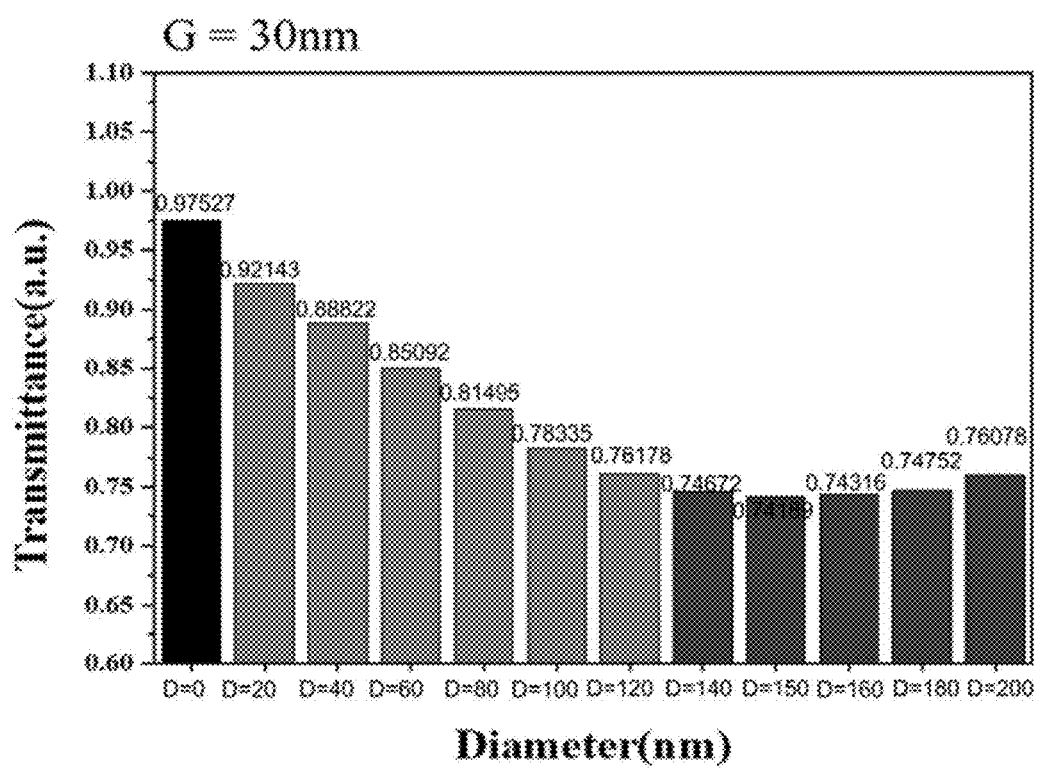

[FIG. 9]
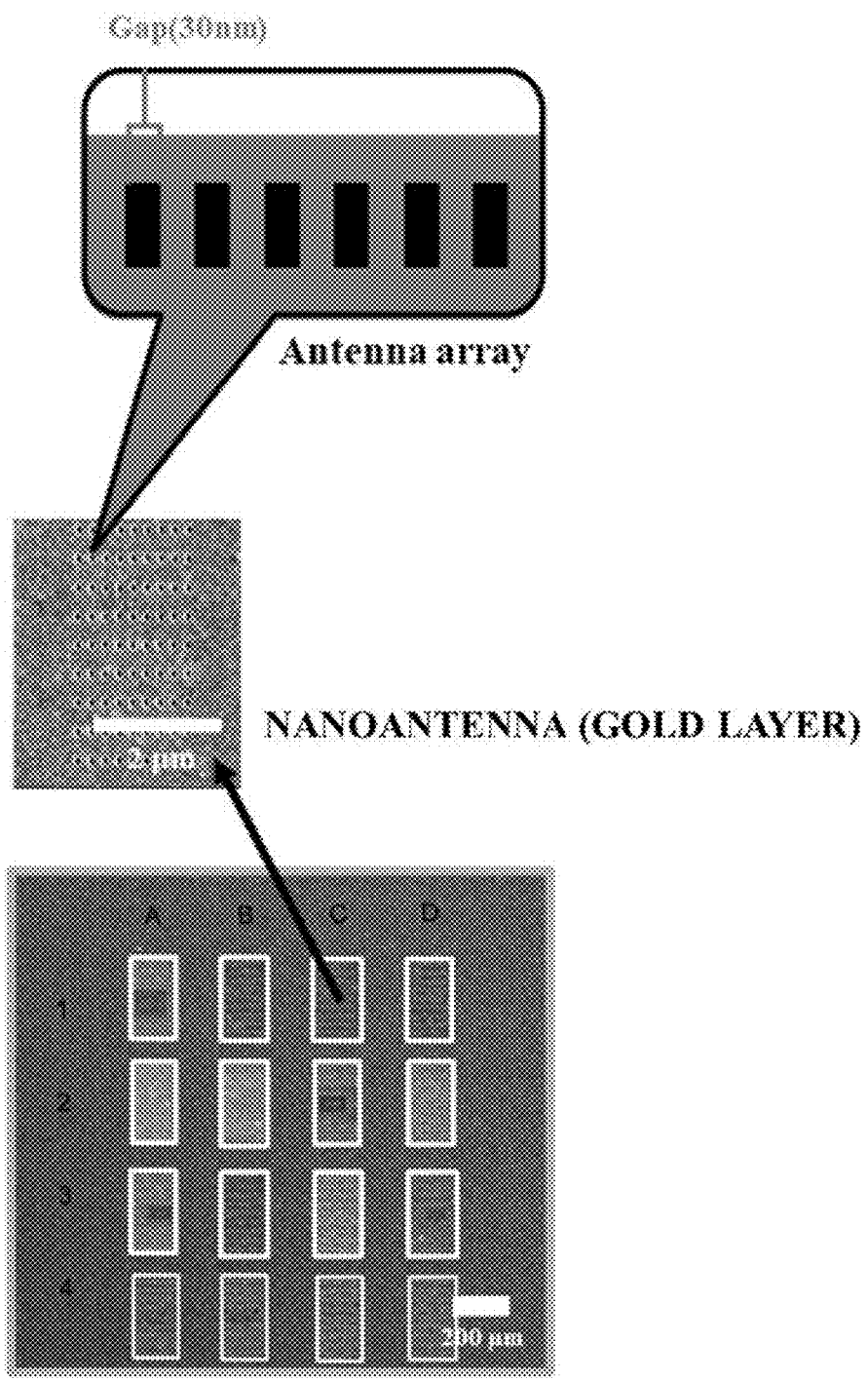

[FIG. 10]
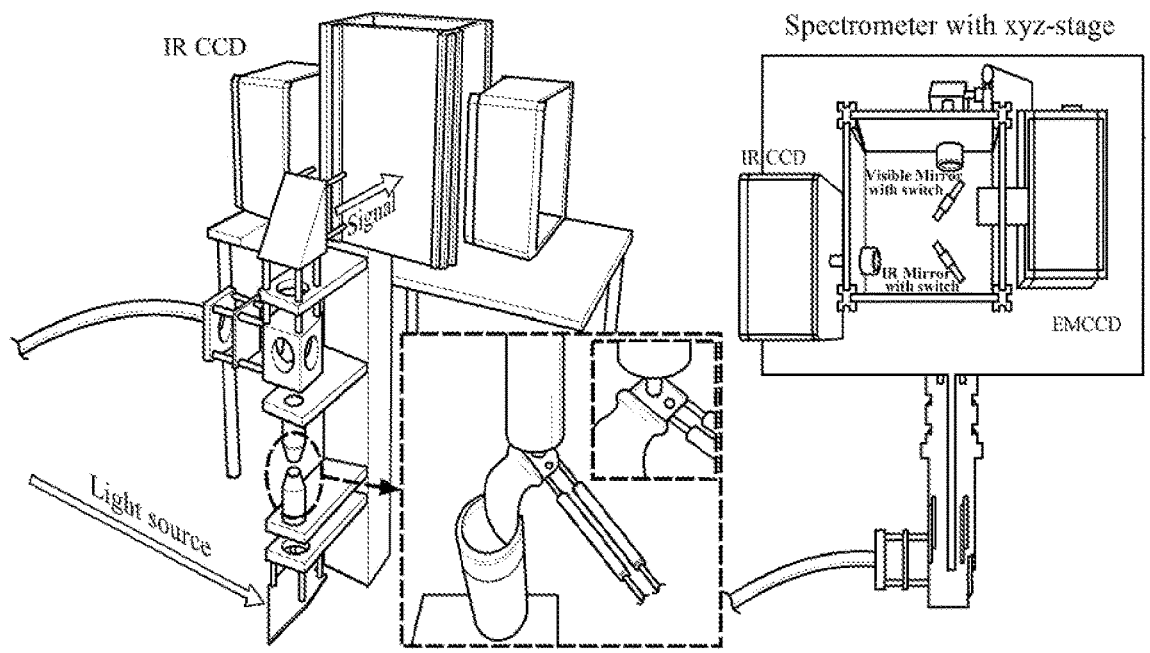
[FIG. 11]
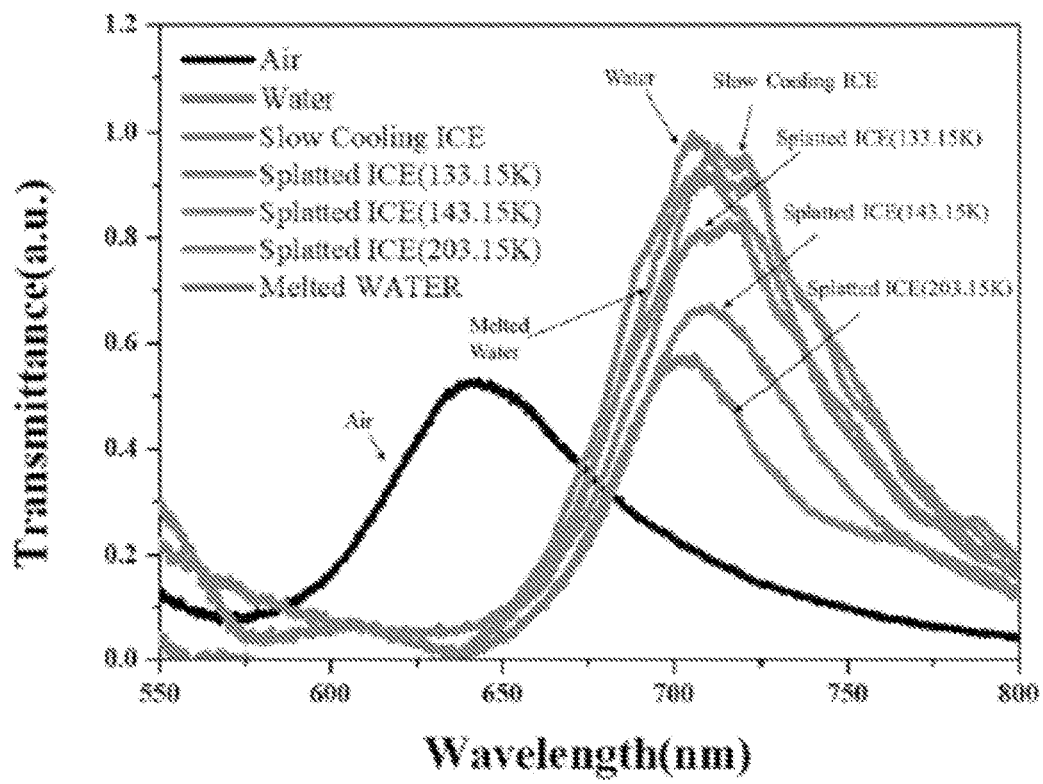

[FIG. 12]
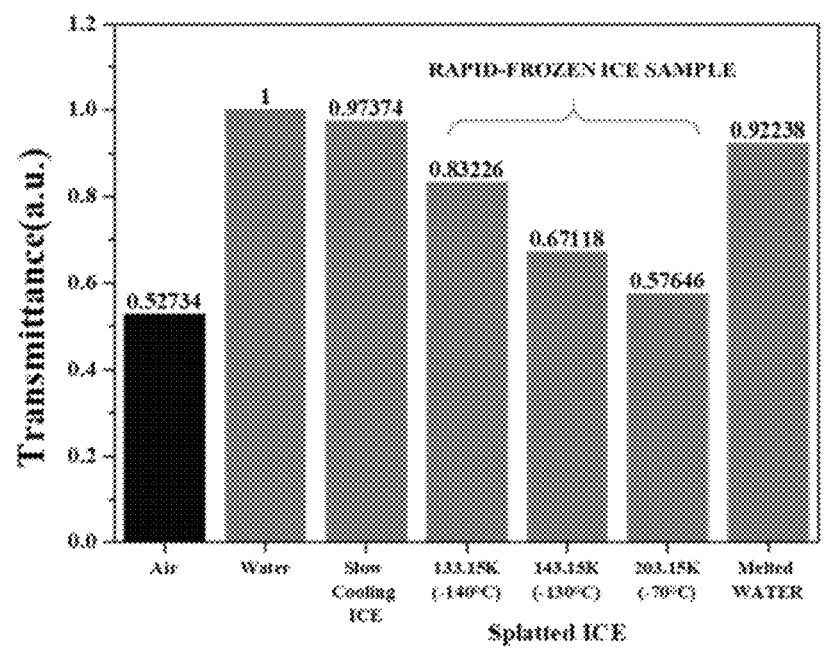
[FIG. 13]
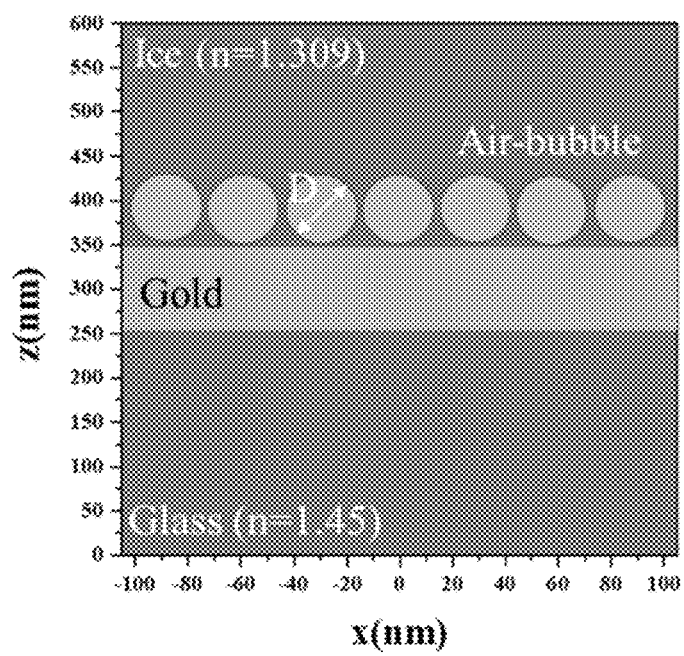

[FIG. 14]
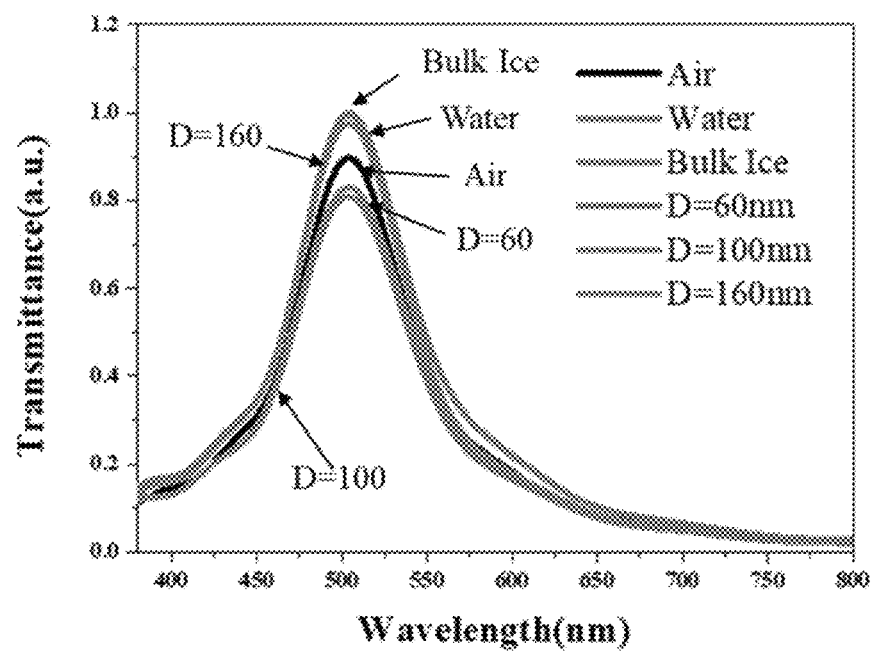
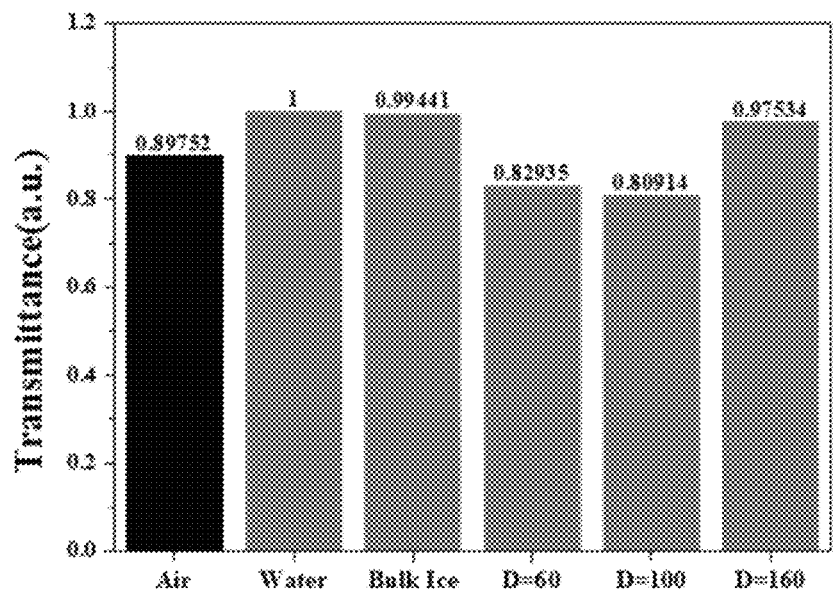

[FIG. 15]
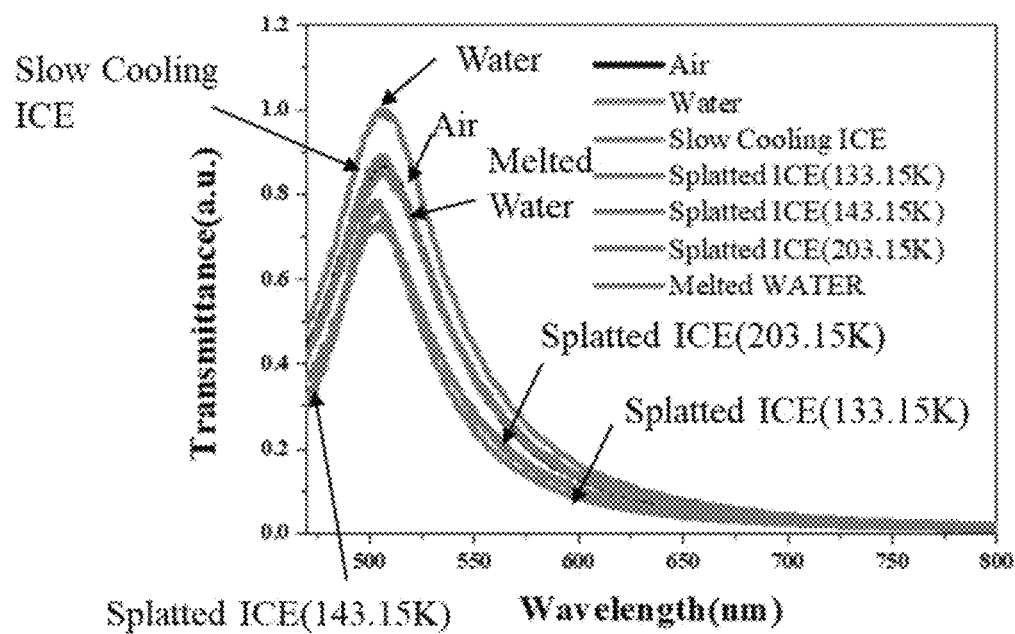
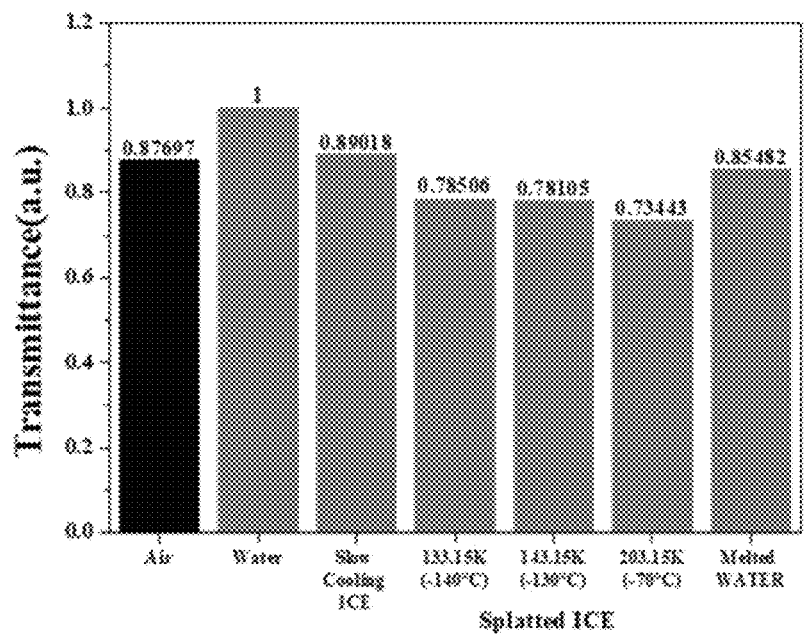

[FIG. 16]
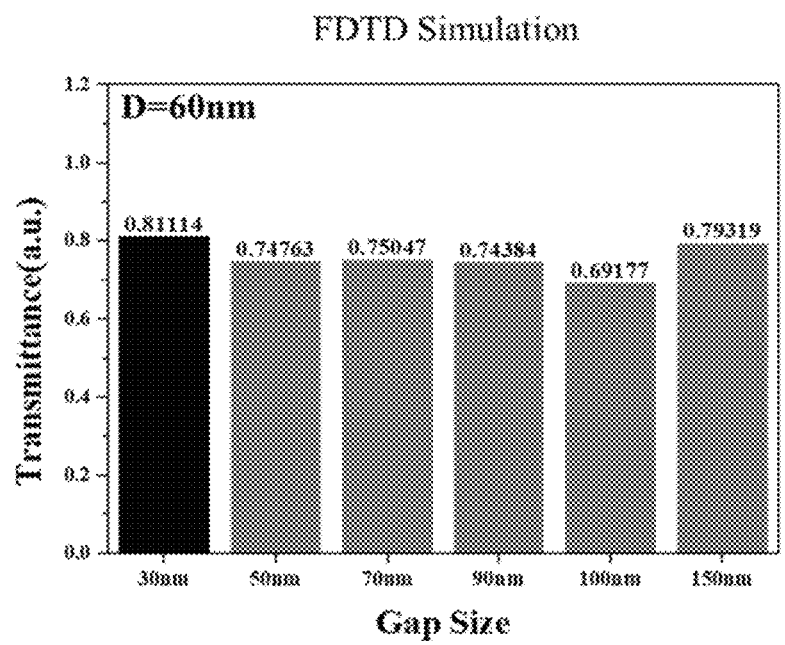
[FIG. 17]
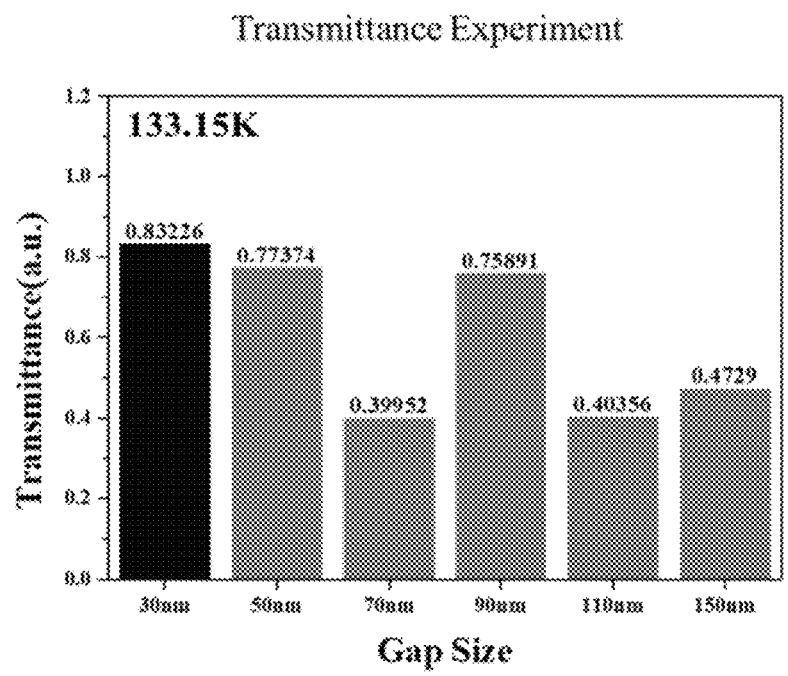

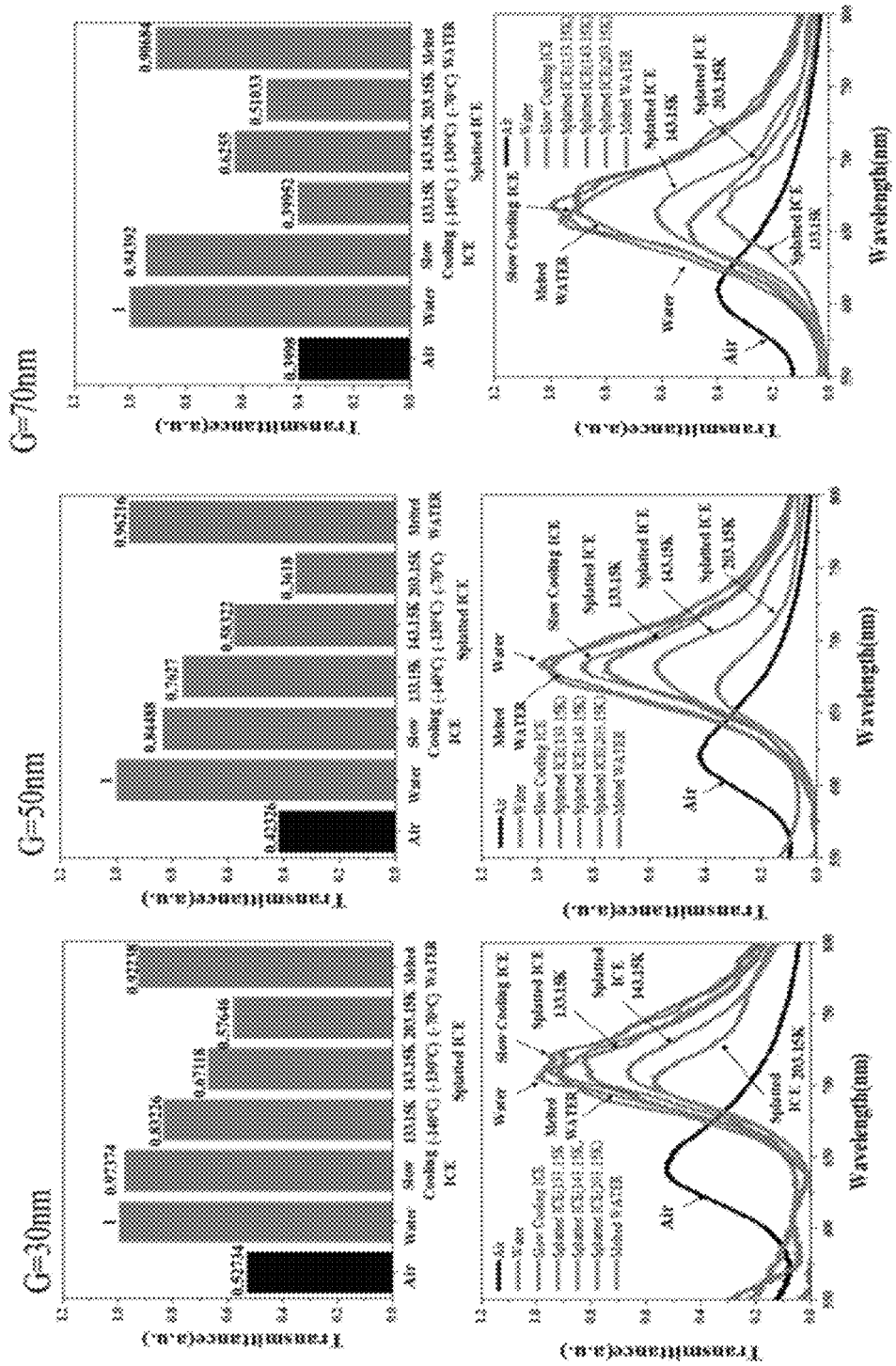
[FIG. 18]

DEVICE FOR MEASURING A PARTICLE SIZE OF SAMPLE

BACKGROUND OF THE INVENTION

1. Field of the Invention

The present invention relates to a device for measuring a particle size of a sample.

2. Description of the Related Art

Surface plasmon polaritons (SPPs) are collective charge density oscillations of quasi-particles that are a combination form of light and free electrons in metal when the light is incident on an interface between a dielectric and the metal, and are electromagnetic waves that proceed along the interface. The SPPs exist with being strongly bound to the interface between the dielectric and the metal, such that they can exist even in a space not more than a diffraction limit in which electromagnetic waves cannot exist in general. Therefore, light can effectively exist in a form of SPPs even in a nano-sized local space, such that many researches related to nano-optical devices based on the this principle have been conducted. A plasmon optical antenna is an optical element in which light incident thereon may be coupled to an antenna structure to be detected as a signal.

PRIOR ART DOCUMENT

[Patent Document]
Korean Patent Laid-open Publication No. 10-2014-0059368

SUMMARY OF THE INVENTION

It is an object of the present invention is to provide a device for measuring a particle size of a sample.

To achieve the above objects, the following technical solutions are adopted in the present invention.

1. A device for measuring a particle size at a lower temperature, including: a refrigerant tank containing a refrigerant; a heat conduction plate thermally connected to the refrigerant tank; and a nanoantenna located on the heat conduction plate.

2. The device according to the above 1, further including a temperature sensor for measuring a temperature of the nanoantenna.

3. The device according to the above 1, further including a transmittance sensor for measuring a degree of light transmitted to an upper portion of the nanoantenna.

4. The device according to the above 1, wherein the refrigerant is at least one selected from the group consisting of liquid helium, liquid nitrogen, liquid oxygen, liquid hydrogen, liquid neon, liquid fluoro, liquid chlorine and liquid xenon.

5. The device according to the above 1, wherein the heat conduction plate includes at least one selected from the group consisting of aluminum, gold, silver, tungsten, iron, carbon steel, copper, bronze, brass, lead, nickel and platinum.

6. The device according to the above 1, wherein the heat conduction plate is configured to transmit a heat to the nanoantenna.

7. The device according to the above 1, wherein the nanoantenna includes: a metal layer on which a sample to be measured is located; and a light transmission layer located below the metal layer, of which a lower portion is irradiated with light, wherein the metal layer has a thickness of 60 nm to 150 nm.

8. The device according to the above 7, wherein the metal layer includes at least one hole having a hole gap of 30 nm or more but less than 70 nm.

9. The device according to the above 7, wherein the metal layer includes at least one selected from the group consisting of gold, silver, copper, brass and aluminum.

10. The device according to the above 1, wherein the sample to be measured is a cooled sample.

The device of the present invention can accurately predict the states or physical properties (physical or chemical characteristics, etc.) of the sample by determining a degree of light transmittance to the sample to be measured, which is located on the nanoantenna.

The device of the present invention can measure even particles having a size smaller than the wavelength of light by measuring the light transmittance to the sample to be measured.

BRIEF DESCRIPTION OF THE DRAWINGS

The above and other objects, features and other advantages of the present invention will be more clearly understood from the following detailed description taken in conjunction with the accompanying drawings, in which:

FIG. 1 is a perspective view schematically illustrating a device for measuring a particle size at a low temperature;

FIG. 2 is a perspective view schematically illustrating a process of locating a sample in the device for measuring a particle size at a low temperature and measuring ice grain size;

FIG. 3 is a perspective view illustrating a structure of an upper surface of a nanoantenna;

FIG. 4 is a cross-sectional view illustrating a structure of the nanoantenna on which a sample to be measured is placed;

FIG. 5 is a schematic view illustrating a state in which rapidly cooled ice grains are located on a nanoantenna sensor using surface plasmon;

FIG. 6 is a schematic view illustrating light distribution of the nanoantenna having plasmons formed on the surface thereof;

FIG. 7 is graphs illustrating transmission spectra and transmission intensities of samples located on the nanoantenna by type;

FIG. 8 is a graph illustrating simulation results of a change in transmittance intensity according to the ice grain size included in the sample located on the nanoantenna;

FIG. 9 is a view illustrating an image of the nanoantenna confirmed by using a scanning electron microscope according to an embodiment;

FIG. 10 is a photograph illustrating a device for measuring a particle size at a low temperature according to the embodiment;

FIG. 11 is a graph illustrating the transmission spectrum according to the types of samples located on the nanoantenna;

FIG. 12 is a graph illustrating the transmission intensity according to the types of the samples located on the nanoantenna;

FIG. 13 is a schematic view illustrating a form in which samples are located on a gold thin film;

FIG. 14 are graphs illustrating the transmission spectra and transmission intensities according to the types of samples located on the gold thin film and the ice grain size included in the sample;

FIG. 15 are graphs illustrating simulation results of a change in transmittance intensity according to the types of samples located on the gold thin film;

FIG. 16 is a graph illustrating simulation results of a change in transmittance intensity according to hole gaps of the nanoantenna;

FIG. 17 is a graph illustrating experimental results of the transmittance intensity according to the hole gaps of the nanoantenna; and FIG. 18 is graphs illustrating the transmission spectra and the transmission intensities according to the hole gaps of the nanoantenna and the types of samples placed on the nanoantenna.

DETAILED DESCRIPTION OF THE INVENTION

A device 1000 for measuring a particle size of a sample at a low temperature will be described with reference to FIG. 1. As used herein, the term "low temperature" refers to a temperature of −60° C. or less, and the term "cryogenic temperature" refers to a temperature of −100° C. or less. The present invention provides the device 1000, which includes a refrigerant tank 100 containing a refrigerant; a heat conduction plate 200 thermally connected with the refrigerant tank 100; and a nanoantenna 300 located on the heat conduction plate 200.

The device 1000 for measuring a particle size at a low temperature of the present invention includes the nanoantenna 300 capable of forming plasmons, thereby measuring particles of a very small size. Typically, it is difficult to measure particles having a size smaller than a wavelength of light, whereas the device of the present invention can form plasmons by irradiation of light, therefore, it is possible to measure particles having a size smaller than the wavelength of light.

As used herein, the term "plasmon" refers to collective charge density oscillations of quasi-particles that are a combination form of light and free electrons in metal when the light is incident on an interface between a dielectric and the metal, and are electromagnetic waves that proceed along the interface. Typically, the plasmon may be utilized in organic light emitting materials, electrodes, biosensors, lasers and the like.

Meanwhile, in the device 1000 for measuring a particle size included in a sample at a low temperature of the present invention, the refrigerant tank 100 and the nanoantenna 300 are thermally connected with each other using the heat conduction plate 200, such that physical properties and conditions of samples cooled to a low or cryogenic temperature (e.g., ice, frozen food, etc.) may be accurately measured. In addition, using the device of the present invention, it is possible to confirm a change between water and ice, as well as ice crystals.

The refrigerant tank 100 is a container that can contain a refrigerant, and a shape or volume thereof is not limited as long as it can contain the refrigerant. For example, the refrigerant tank may have a form of a cylinder as shown in FIG. 1.

The refrigerant may be at least one selected from the group consisting of liquid helium, liquid nitrogen, liquid oxygen, liquid hydrogen, liquid neon, liquid fluoro, liquid chlorine and liquid xenon, and specifically may be liquid nitrogen.

The refrigerant may be a liquid of less than 0° C., for example, a liquid of −300° C. to −100° C., −100° C. to −10° C., but it is not limited thereto.

By varying an amount of the refrigerant contained in the refrigerant tank 100, it is possible to control a heat energy of a refrigerant transmitted through the heat conduction plate 200 or a temperature that can be maintained in the nanoantenna 300.

For example, if the refrigerant tank 100 contains a relatively small amount of refrigerant, a temperature of the refrigerant that is transmitted through the heat conduction plate 200 may be relatively high, and a temperature that can be maintained in the nanoantenna 300 may be relatively high. Meanwhile, if the refrigerant tank 100 contains a relatively large amount of refrigerant, the temperature of the refrigerant that is transmitted through the heat conduction plate 200 may be relatively low, and a temperature that can be maintained in the nanoantenna 300 may be relatively low.

In addition, according to a distance of the nanoantenna 300 from the refrigerant tank 100 or a distance from an end of the heat conduction plate 200 connected to the refrigerant tank 100, the temperature that can be maintained in the nanoantenna 300 may be controlled.

For example, if the distance from the refrigerant tank 100 to the nanoantenna 300 is relatively long, the temperature that can be maintained in the nanoantenna 300 may be relatively high.

For example, if the distance from the refrigerant tank 100 to the nanoantenna 300 is relatively short, the temperature of the refrigerant that can be maintained in the nanoantenna 300 may be relatively low.

The heat conduction plate 200 may be thermally connected with the refrigerant tank 100. As used herein, the term "thermally coupled" means that both components may be connected with each other so as to transmit the heat energy or temperature of the refrigerant from the refrigerant tank.

The heat conduction plate 200 may transmit a heat or temperature from the refrigerant contained in the refrigerant tank 100 to the nanoantenna 300. Specifically, the heat conduction plate 200 may transmit the heat or temperature from the refrigerant contained in the refrigerant tank 100 to a metal layer 310 of the nanoantenna 300.

The heat conduction plate 200 may be connected to an inner bottom of the refrigerant tank 100, an inner side of the refrigerant tank 100, or an outer portion of the refrigerant tank 100, and specifically may be connected to the inner bottom or inner side thereof. However, the connected position is not limited as long as it can transmit the heat from the refrigerant contained in the refrigerant tank.

The heat conduction plate 200 may be directly or indirectly connected to the refrigerant tank 100.

A shape or size of the heat conduction plate 200 is not limited, as long as the nanoantenna 300 can be located thereon.

According to one embodiment, the heat conduction plate 200 may be bent (see FIG. 1).

The heat conduction plate 200 may include a surface having an angle to the ground of 0° to 85°, 0° to 80°, 0° to 750, 0° to 70°, 0° to 650, 0° to 600, 0° to 550, 0° to 500, 0° to 45°, 0° to 40°, 0° to 35°, 0° to 30°, 0° to 25°, 0° to 20°, 0° to 15°, 0° to 10° or 0° to 5°, and specifically may include a surface having an angle to the ground of 0° to 5°, but it is not limited thereto.

According to one embodiment, the heat conduction plate 200 may include a horizontal plane substantially horizontal to the ground.

If a difference in the angle of the heat conduction plate to the ground is large, or the heat conduction plate does not have the horizontal plane, it is difficult to measure a sample to be measured because the sample to be located on an upper portion of the nanoantenna 300 is not fixed.

The heat conduction plate 200 may include metal having high thermal conductivity as a component. For example, the heat conduction plate 200 may include at least one selected from the group consisting of aluminum, gold, silver, tungsten, iron, carbon steel, copper, bronze, brass, lead, nickel and platinum, or an alloy thereof, but it is not limited thereto.

The nanoantenna 300 may be included inside the heat conduction plate 200.

A thickness of the nanoantenna 300 may be the same as the thickness of the heat conduction plate 200 or smaller than the thickness of the heat conduction plate 200.

The nanoantenna 300 may be included in the horizontal plane of the heat conduction plate 200, which is substantially horizontal to the ground. As described above, when the nanoantenna 300 is not located on the horizontal plane of the heat conduction plate 200, which is substantially horizontal to the ground, it may be difficult to accurately measure the sample to be measured because the sample is not fixed.

The device 1000 for measuring a particle size at a low temperature may further include a temperature sensor for measuring the temperature of the nanoantenna.

The temperature sensor may be directly or indirectly coupled to the nanoantenna 300, or may not be coupled thereto. That is, whether or how the temperature sensor is coupled to the nanoantenna 300 is not limited, as long as it can measure the temperature thereof.

When the temperature of the nanoantenna 300 measured by the temperature sensor is substantially maintained within a predetermined temperature, the sample to be measured is located on an upper portion of the metal layer 310 of the nanoantenna 300, and then measurement of physical properties of the sample is performed. If the temperature thereof is not maintained within the predetermined temperature, since the particle size of the sample changes, it is difficult to accurately measure physical properties of the sample at a specific temperature, and it is difficult to observe a change in physical properties according to the change in the temperature.

The device 1000 for measuring a particle size at a low temperature may further include a transmittance sensor for measuring a degree of light transmitted to the upper portion of the nanoantenna 300.

More specifically, the inventive device may further include the transmittance sensor for measuring the degree of light which passes through the sample to be measured located on the upper portion of nanoantenna 300, thus to be transmitted.

The nanoantenna 300 will be described in more detail with reference to FIG. 3.

The nanoantenna 300 includes the metal layer 310 and a light transmission layer 330 located below the metal layer 310.

The metal layer 310 and the light transmission layer 330 may be directly coupled to each other, or may be indirectly coupled to each other, and specifically, is directly coupled to each other, but it is not limited thereto.

The sample to be measured may be located on the upper portion of the metal layer 310.

The sample to be measured may be a cooled sample, but it is not limited thereto.

The cooled sample may be ice, frozen food, frozen cells, frozen bacteria, frozen yeast, frozen platelets, frozen red blood cells, frozen eggs or frozen sperms, but it is not limited thereto.

The cooled sample may be in an already cooled state when locating on the nanoantenna 300, and may be in an uncooled liquid state before locating on the nanoantenna 300 but may be cooled on the nanoantenna 300 by the heat energy transmitted from the refrigerant tank 100 after locating on the nanoantenna 300.

The metal layer 310 may include at least one selected from the group consisting of gold, silver, copper, brass and aluminum, but it is not limited thereto.

The metal layer 310 may include at least one hole 350.

As used herein, the term "hole" is a hole penetrated in the metal layer 310, and refers to a region through which light is transmitted when irradiating a lower portion of the nanoantenna 300 with light.

When transmitting the irradiated light through the hole, plasmons are generated on a surface of the metal layer 310, and the transmittance of light to be measured on the upper portion of the nanoantenna 300 may vary according to types of a sample 400 to be measured. Therefore, the types and physical properties of the sample 400 to be measured may be determined from light transmittance values specified in the upper portion of the nanoantenna 300.

A lateral width (referred to as a 'gap' in the present disclosure) 30 of the hole in one hole 350 may be 10 to 200 nm.

The gap 30 of the hole in one hole 350 may be 5 to 55 nm, 10 to 50 nm, 15 to 45 nm, 20 to 40 nm, 25 to 35 nm, and specifically may be 25 to 35 nm, but it is not limited thereto.

The gap 30 of the hole in one hole 350 may be 5 to 95 nm, 10 to 90 nm, 15 to 85 nm, 20 to 80 nm, 25 to 75 nm, 30 to 70 nm, 35 to 65 nm, 40 to 60 nm, 45 to 55 nm, but it is not limited thereto.

The gap 30 of the hole in one hole 350 may be 30 nm or more but less than 70 nm. If the hole gap 30 is 70 nm or more, a tendency of the transmittance to be measured according to the physical properties of the sample (for example, the sample particle size) is not consistent, and thereby it is difficult to accurately measure the physical properties of the sample.

A longitudinal width (referred to as a 'width' in the present disclosure) 50 of the hole in one hole 350 may be 50 to 150 nm, 60 to 140 nm, 70 to 130 nm, 80 to 120 nm or 90 to 110 nm, and specifically may be 90 to 110 nm, but it is not limited thereto.

The metal layer 310 may include a plurality of holes 350, for example, 2×2 to 16×16 holes, 3×3 to 15×15 holes, 4×4 to 14×14 holes, 5×5 to 13×13 holes, 6×6 to 12×12 holes, 7×7 to 11×11 holes, or 8×8 to 10×10 holes, and may include 9×9 holes in one embodiment, but it is not limited thereto.

The metal layer 310 may include a plurality of holes 350, and may include for example, 10×7 to 16×10 holes, 9×6 to 15×9 holes, 8×5 to 14×8 holes, 7×4 to 13×7 holes, 6×3 to 12×6 holes, or 5×2 to 11×5 holes, but it is not limited thereto.

As used herein, the expression "n×m" denotes (the number of holes 350 present in a row)×(the number of holes 350 present in a column) of the metal layer 310 of the nanoantenna.

When the plurality of holes 350 are included in the metal layer 310, the respective holes 350 may be arranged at a specific period.

When the plurality of holes 350 are included in the metal layer 310, a lateral interval 70 between the holes may be 5 to 15 times, 6 to 14 times, 7 to 13 times, 8 to 12 times, and 9 to 11 times the gap 30 of the hole 30, but it is not limited thereto.

When the plurality of holes 350 are included in the metal layer 310, the lateral interval 70 between the holes may be 400 nm, 150 to 350 nm, or 200 to 300 nm, but it is not limited thereto.

When the plurality of holes 350 are included in the metal layer 310, a longitudinal interval 90 between the holes may be 2 to 6 times, or 3 to 5 times the width of the hole 50, but it is not limited thereto.

When the plurality of holes 350 are included in the metal layer 310, the longitudinal interval 90 between the holes may be 100 to 750 nm, 150 to 700 nm, 200 to 650 nm, 250 to 600 nm, 300 to 550 nm, 350 to 500 nm, or 400 to 450 nm, but it is not limited thereto.

A thickness 10 of the metal layer may be 60 nm to 150 nm, 70 nm to 140 nm, 80 nm to 130 nm, 90 nm to 120 nm, or 95 nm to 110 nm, and specifically may be 95 nm to 110 nm, but it is not limited thereto.

When the thickness 10 of the metal layer exceeds 150 nm, the metal layer 310 repeatedly contracts and expands when cooling or raising the temperature. Therefore, the transmittance of light on the upper portion of the nanoantenna 300 changes with the temperature, such that it is difficult to accurately measure the physical properties of the sample 400 to be measured.

Meanwhile, if the thickness 10 of the metal layer is less than 60 nm, light may also be transmitted to a portion other than the holes 350 of the metal layer. In particular, if the thickness 10 of the metal layer is 50 nm or less, the metal layer is bumpy, such that it is difficult to accurately measure the physical properties of the sample.

In addition, the metal layer 310 is a layer having properties capable of transmitting or conducting a heat, and a heat energy transmitted from the refrigerant tank 100 by the heat conduction plate 200 may be transmitted to the metal layer 310. Therefore, the physical properties of the sample 400 to be measured, which is placed on the metal layer 310, may be accurately measured at a desired temperature.

The light transmission layer 330 may include any one selected from the group consisting of glass, sapphire, ceramic, or common dielectrics (dielectric materials) such as a silicon wafer slide or wafer, or dielectrics of conductive oxides (transparent conductive oxides) such as $Al_2O_3$, MgO, ZnO, ZnS, or indium tin oxide (ITO), and specifically may include glass.

A refractive index of the light transmission layer 330 may be 1.1 to 2, or 1.2 to 1.5, but it is not limited thereto.

A lower portion of the light transmission layer 330 is a portion with which light is irradiated, and the irradiated light may pass through to the light transmission layer 330.

A method for measuring the physical properties of a sample to be measured by using the device 1000 for measuring a particle size at a low temperature will be described with reference to FIGS. 2 and 4.

The present invention provides a method for quantitatively or qualitatively measuring the physical properties of the sample, in particular the particle size contained in the sample. By using the measuring method of the present invention, the types or properties of the sample may be determined by quantitatively or qualitatively measuring the size of the particles contained in the sample.

The method for measuring the physical properties of the sample includes: the steps of locating the sample 400 to be measured on the upper portion of the metal layer 310 of the nanoantenna 300 in the device 1000 for measuring a particle size at a low temperature; and irradiating the lower portion of the nanoantenna 300 with light (see FIG. 2).

When irradiating the lower portion of the nanoantenna 300 with light, the irradiated light may pass through the light transmission layer 330, and then pass through the hole 350 of the metal layer 310, thus plasmons may be generated on the surface of the metal layer 310. That is, as described above, the measuring method of the present invention may form plasmons by using the nanoantenna 300 including the metal layer 310 and the light transmission layer 330, and thereby even particles 40 having a size smaller than the wavelength of light may be measured.

The device 1000 for measuring a particle size at a low temperature, the nanoantenna 300, the metal layer 310, and the sample to be measured have been described above, therefore will not be described in detail.

The method for measuring physical properties of the sample may further include the step of measuring light transmittance on the upper portion of the nanoantenna 300 after irradiating the lower portion of the nanoantenna 300 with the light.

After irradiating the lower portion of the nanoantenna 300 with the light, the light transmittance according to the state of the upper portion of the nanoantenna 300 may be confirmed to determine the state or properties of the sample 400 to be measured.

Depending on the state of the sample 400 to be measured, the particle size of the particles 40 included in the sample 400 may be different, and the light transmittance to the sample 400 to be measured may vary depending on the particle size of the particle 40. Therefore, the sizes of the particles 40 may be predicted by measuring the light transmittance on the upper portion of the sample 400 to be measured, from which the physical properties and state of the sample 400 to be measured may be determined.

The method for measuring physical properties of the sample may further include determining whether the temperature of the nanoantenna 300 reaches a predetermined temperature range before locating the sample 400 to be measured thereon.

When the sample 400 to be measured is a cooled sample, and if the temperature of the nanoantenna 300 is different from the desired temperature at the time of locating the sample 400 on the nanoantenna 300 for measuring the physical properties, it is difficult to accurately measure the physical properties of the sample at a desired temperature.

Hereinafter, the present invention will be described in detail with reference to examples.

EXAMPLE

1. Identification of Transmission Spectra of Ice Using Nanoantenna Through Finite-Difference Time-Domain (FDTD) Simulation 1-1. Experiment Method Transmission spectra according to the states of samples located on the nanoantenna were confirmed by using surface plasmon through FDTD simulation (FDTD Solutions, Lumerical Inc.), which can measure small changes in size.

Based on a schematic view of rapidly cooled ice grains on the nanoantenna using surface plasmon of FIG. 5 and an electromagnetic field distribution of the nanoantennas using the surface plasmon of FIG. 6, the FDTD simulation was performed.

In order to identify plasmon effects according to the sample of the plasmonic nanoantenna, theoretical analysis of the electromagnetic field distribution around the nanostructure was performed by using a finite-difference time-domain (FDTD) method. Specifically, calculation was performed by a 3D FDTD method using a FDTD-Lumerical™ simulation package. Electromagnetic field distribution was analyzed by irradiating with a plane source ($\lambda$=380 to 900 nm) in a mesh size of 1 nm to obtain transmission spectra according to the samples. Geometric models for nanoantennas were fabricated based on experimentally observed structure indexes.

In addition, the same method as described above was performed to confirm the transmission spectra according to the states on the structure in which only a gold thin film is formed without a hole instead of the nanoantenna. Based on a schematic view of a form in which ice grains are located on the gold thin film in FIG. 13, the FDTD simulation was performed.

1-2. Experimental Result

When air (n=1), water (n=1.33) and ice (n=1.309) are located on nanostructures (a gold thickness on a glass substrate: 100 nm, a lattice interval on an x-axis (lateral interval between holes): 210 nm, a lattice interval on a y-axis (longitudinal interval between holes): 440 nm, hole gap: 30 nm, a hole width: 100 nm) at the time of irradiating with light at $\lambda$=380 to 900 nm through the FDTD-simulation, movement and transmission intensities of the spectra transmitted after resonance in the nanoantenna was confirmed. In addition, graphs showing transmission spectra and transmission intensities of ice containing particles with different sizes due to rapid cooled were also confirmed (see FIG. 7).

FIG. 8 is a graph illustrating simulation results of a change in transmittance intensity in the nanoantenna according to the particle size included in the sample located on the nanoantenna. As shown in FIG. 8, the light transmittance is decreased as the particle size of the sample is increased to a certain range.

FIG. 16 is a graph illustrating the transmittance of a sample containing particles having a diameter size D of 60 nm at each of the nanoantennas having different hole gaps (hole gaps: 30 nm, 50 nm, 70 nm, 90 nm, 100 nm and 150 nm).

Meanwhile, FIG. 14 is graphs illustrating the transmission spectra and transmission intensities according to the types of materials (air, water, rapid cooling ice, and ice containing particles having different sizes (D: particle diameter)) located on a gold thin film structure. As shown in FIG. 14, unlike a case of using a nanoantenna, a case of using the gold thin film structure exhibited spectra in which light is largely absorbed at 500 nm without a change in the spectra even when changing the types of the materials, and the transmittance was not significantly changed even if the particle sizes are varied. From these results, the use of a gold thin-film structure makes it difficult to accurately measure small particles.

2. Measurement of Particle Size Using Nanoantenna 2-1. Experiment Method

After depositing 100 nm of the gold thin film 310 on a glass substrate 330 using an E-beam evaporator, nanoantennas were fabricated by regularly arranging 9×9 holes (hole gap: 30 nm) in the gold thin film deposited using focused ion beams (FIBs) (see FIG. 3). The fabricated nanoantennas was observed by using scanning electron microscope (SEM) (see FIG. 9).

Then, sizes of particles included in the sample were measured using the nanoantenna in which 9×9 holes (hole gap: 20 nm) are regularly arranged. Specifically, after irradiating the device containing the nanoantenna with light (see FIG. 10), positions of the samples were confirmed using EMCCD (iXon 89 EMCCD Cameras (iXon 897), Andor Inc.), and light transmitted through the nanoantenna was measured by a spectrophotometer camera (Andor iDus 401 Spectroscopy Cameras, Andor Inc.).

In order to determine an operation of the nanoantenna, the transmission spectra were first confirmed in the air state. Water was sprayed on the upper portion of the nanoantenna to confirm the transmittance according to the change of materials. In order to determine whether the nanoantenna also reacts to the change of states of the same material, the water sprayed on the upper portion of the nanoantenna was slowly cooled to confirm the transmittance of the slowly cooled ice state. The cooled ice was melted and then the melted water was placed on the upper portion of the nanoantenna, and the transmittance was measured.

After rapidly cooling the nanoantenna to −170° C. or less using liquid nitrogen to make rapidly cooled ice crystals, water was dropped on the nanoantenna from over about 1.5 m to form a thin and rapidly cooled ice film thereon, and then the cooled ice film (sample) was transferred into a measuring device (see FIG. 10), which was cooled and maintained at respective measurement temperatures (−140° C., −130° C., and −70° C.), followed by measuring the transmittance.

In addition, the light transmittance of the sample was measured by performing the same method as Experimental Method 2-1, except for using a structure in which only a gold thin film without a hole was formed instead of the nanoantenna.

2-2. Experimental Result

As shown in FIG. 11, it was confirmed that, as the refractive indexes of the materials (air, water, ice, rapidly cooled ice, and melted water) were increased, a resonant wavelength was shifted to a longer wavelength in the nanoantenna, as well as, it was also experimentally confirmed that the transmittance was increased as a difference in the refractive index was reduced. This corresponds to the FDTD simulation result.

As shown in FIG. 12, it was confirmed that a rapid-frozen ice sample had a lower transmittance than water, slow-frozen ice, and ice-melted water. From these results, it can be expected that the particle size of the rapid-frozen ice is larger than that of the slow-frozen ice.

In addition, it was observed that, in a case of the rapid-frozen ice, the transmittance of the light was reduced and scattering thereof was increased as the measurement temperature was increased (−140° C., −130° C., and −70° C.). These results are consistent with the fact that ice crystals are gradually grown due to recrystallization and the FDTD simulation results, and exhibit that the sizes of the particles included in the ice change as a temperature for maintaining the rapid-frozen ice is increased.

FIG. 17 is a graph illustrating results of measuring the transmittance of a sample in a state in which each of nanoantennas (hole gap: 30 nm, 50 nm, 70 nm, 90 nm, 100 nm and 150 nm) with different hole widths is rapidly cooled to −170° C. or less, and then water is dropped on the nanoantenna to form a rapidly cooled ice film thereon, followed by maintaining at 133.15K (−140° C.).

FIG. 18 is graphs illustrating simulation results of a change in the transmittance intensity according to the types of sample in the nanoantenna having a hole gap of 30 nm, 50 nm or 70 nm. Tendencies of changes in the transmittance were similar to each other in the nanoantenna having a hole gap G of 30 nm and the nanoantenna having a hole gap G of 50 nm. Meanwhile, the tendency of changes in the transmittance according to the types of the sample in the nanoantenna having a hole gap of 70 nm was different from the tendency of changes in the transmittance in the nanoantenna having a hole gap of 30 nm or 50 nm (see FIG. 17).

From these results, it was confirmed that when the hole gap of the nanoantenna is 70 nm or more, it is not easy to accurately measure the physical properties of the sample because the tendency of the transmittance measured according to the type of the sample (e.g., particle size of the sample) is not consistent.

Meanwhile, as shown in FIG. 15, unlike the case of using the nanoantenna, the case of using the gold thin film structure had no change in the wavelength according to the change of material, and exhibited a spectrum in which light is largely absorbed at 500 nm, and in the case of the rapidly cooled ice the transmittance was not significantly reduced. From these results, it can be seen that it is difficult to accurately measure particles having a small size when using the gold thin film structure without a hole.

DESCRIPTION OF REFERENCE NUMERALS

30: Hole gap
100: Refrigerant tank
200: Heat conduction plate
300: Nanoantenna
350: Hole
400: Sample to be measured
1000: Device for measuring a particle size

What is claimed is:

1. A device for measuring a particle size at a lower temperature, comprising:
    a refrigerant tank containing a refrigerant;
    a heat conduction plate thermally connected to the refrigerant tank; and
    a nanoantenna located on the heat conduction plate,
    wherein the nanoantenna comprises:
        a metal layer comprising at least one hole and on which a sample is located; and
        a light transmission layer located below the metal layer,
    wherein a lower portion of the light transmission layer is irradiated with light,
    wherein plasmons are generated on a surface of the metal layer by light passing through the at least one hole, and
    wherein the device is for measuring the particle size of the sample located on the metal layer.

2. The device according to claim 1, wherein the refrigerant is at least one selected from the group consisting of liquid helium, liquid nitrogen, liquid oxygen, liquid hydrogen, liquid neon, liquid fluoro, liquid chlorine and liquid xenon.

3. The device according to claim 1, wherein the heat conduction plate comprises at least one selected from the group consisting of aluminum, gold, silver, tungsten, iron, carbon steel, copper, bronze, brass, lead, nickel and platinum.

4. The device according to claim 1, wherein the heat conduction plate is configured to transmit a heat to the nanoantenna.

5. The device according to claim 1, wherein the metal layer has a thickness of 60 nm to 150 nm.

6. The device according to claim 1, wherein each of at least one hole has a hole gap of 30 nm or more but less than 70 nm.

7. The device according to claim 1, wherein the metal layer includes at least one selected from the group consisting of gold, silver, copper, brass and aluminum.

8. The device according to claim 1, wherein the sample to be measured is a cooled sample.

* * * * *